(12) United States Patent
Petersen et al.

(10) Patent No.: US 7,381,330 B2
(45) Date of Patent: Jun. 3, 2008

(54) CELLULOSE-BASED MICROPOROUS MEMBRANE

(75) Inventors: Rebecca Petersen, Flieden (DE); Markus Hollas, Göttingen (DE); Hans Beer, Waake (DE); Manfred Bobbert, Obernfeld (DE)

(73) Assignee: Sartorius Stedim Biotech GmbH, Goettingen (DE)

( * ) Notice: Subject to any disclaimer, the term of this patent is extended or adjusted under 35 U.S.C. 154(b) by 271 days.

(21) Appl. No.: 10/554,980

(22) PCT Filed: Jun. 8, 2004

(86) PCT No.: PCT/EP2004/006152

§ 371 (c)(1),
(2), (4) Date: Oct. 31, 2005

(87) PCT Pub. No.: WO2004/110601

PCT Pub. Date: Dec. 23, 2004

(65) Prior Publication Data

US 2007/0026219 A1    Feb. 1, 2007

(30) Foreign Application Priority Data

Jun. 13, 2003    (DE) .............................. 103 26 741

(51) Int. Cl.
*B01D 71/16* (2006.01)
(52) U.S. Cl. .............................. 210/500.3; 210/500.29; 210/500.31; 210/500.32; 428/316.6
(58) Field of Classification Search .......... 210/500.27, 210/500.29, 32, 500.3, 500.31, 500.32; 264/41; 428/316.6
See application file for complete search history.

(56) References Cited

U.S. PATENT DOCUMENTS 3,884,801 A * 5/1975 Kesting ...................... 210/655
4,894,157 A * 1/1990 Johnson ...................... 210/490

OTHER PUBLICATIONS

Translation, JP 57-042918, Ishida et al, "Hollow Cellulosic Derivative Fiber", Mar. 10, 1982, 15 pages.*

* cited by examiner

*Primary Examiner*—Hai Vo
(74) *Attorney, Agent, or Firm*—Chernoff Vilhauer McClung & Stenzel LLP

(57) ABSTRACT

There is disclosed a cellulosic microporous filtration membrane with upper and lower porous protective layers with a porous sponge-type intermediate layer between the two protective layers, wherein the sponge-type structure consists of two isotropic regions having different pore sizes.

9 Claims, 2 Drawing Sheets

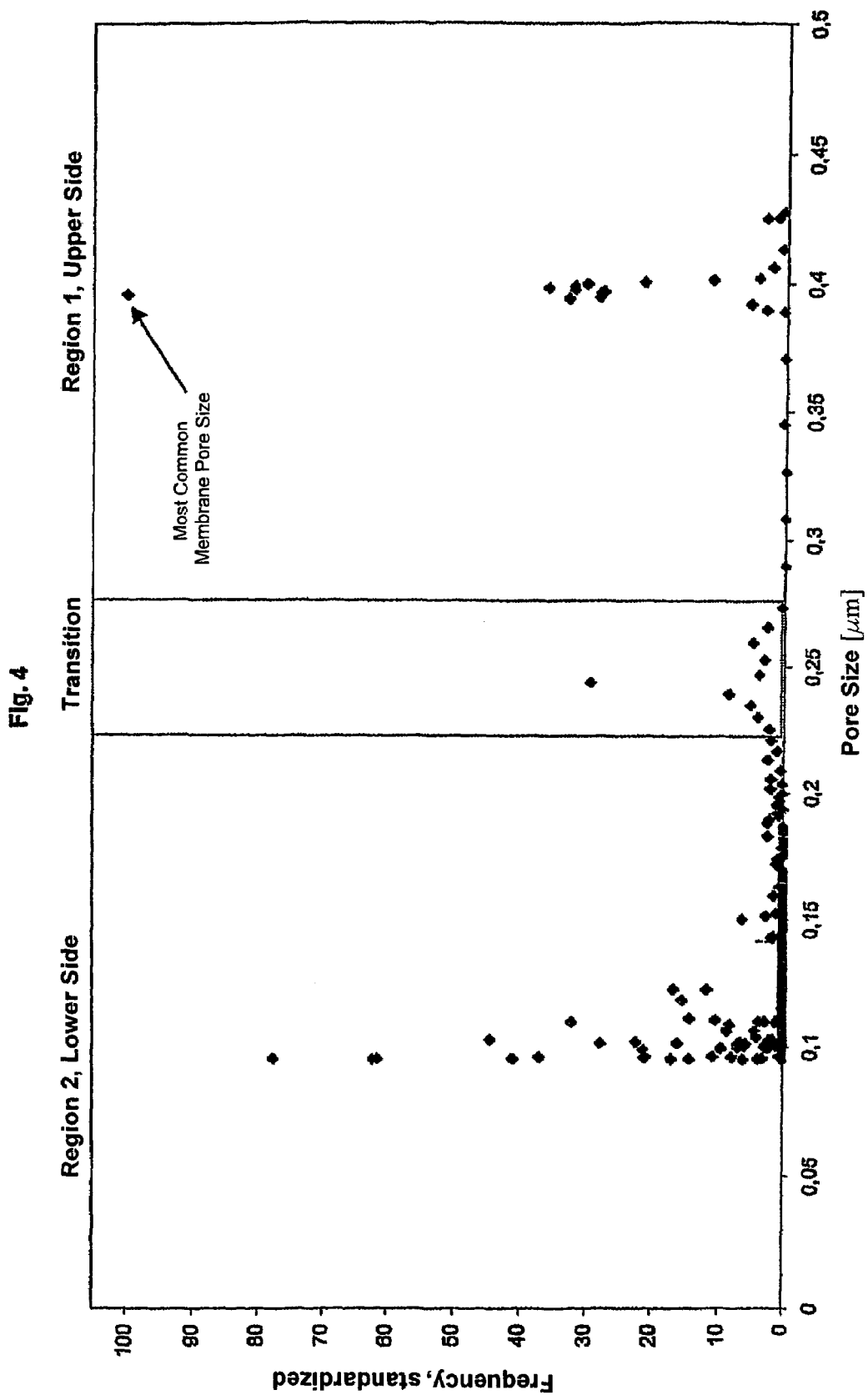

CELLULOSE-BASED MICROPOROUS MEMBRANE

CROSS-REFERENCE TO RELATED APPLICATIONS

This is a 365(c) of PCT/EP2004/006152 filed Jun. 8, 2004, and claims priority of DE 103 26 741.7 filed Jun. 13, 2003.

BACKGROUND OF THE INVENTION

The present invention relates to a cellulosic microporous filtration membrane and to an environmentally friendly method for producing the membrane. Symmetrical cellulosic filtration membranes are known. See DE 44 38 381 A1. Asymmetric membranes are known as well, which are typically made from synthetic polymers such as polysulfone. See EP 1 118 377 A2. Asymmetric membranes are characterized by a pore size gradient throughout the thickness of the membrane, with the smallest diameter pores on the active filtration layer which is situated on the outside of the membrane (feed side or gas side), while the pores with the largest diameters are in an underlying porous layer. With asymmetric membranes, the pore size gradient generally gradually increases throughout the thickness of the membrane. Symmetrical membranes display a substantially uniform pore size diameter throughout the entire thickness of the membrane. A region which has uniformly sized pores is referred to as an isotropic region.

U.S. Patent Application Publication 2003/0038081 A1 describes asymmetric cellulose membranes having first and second layers, as well as an intermediate porous layer between the first and second porous layers. The same Publication describes a membrane provided with a so-called "funnel with a neck" structure and that has an asymmetric and an isotropic region, with the pores in the isotropic region having a uniform size.

EP 0 723 993 B1 describes a method for the production of a cellulose acetate film from a cellulose acetate solution using a solvent consisting of an ester having 3 to 12 carbon atoms.

DE 199 25 929 C2 describes a microfiltration membrane based on cellulose acetate containing hydrophilic silicic acid, and a conventional method for the production of the membrane.

The primary object of the present invention is to provide a cellulosic filtration membrane that has excellent filtration performance and service life, as well as to provide a method of making such a membrane that is particularly environmentally friendly.

The foregoing and other objectives, features, and advantages of the invention will be more readily understood upon consideration of the following detailed description of the invention taken in conjunction with the accompanying drawings.

BRIEF SUMMARY OF THE INVENTION

The present invention provides a cellulosic microporous filtration membrane having an upper integral porous protective layer, a lower integral porous protective layer, and a porous sponge-type intermediate layer between the upper and lower layers, wherein the intermediate layer has two isotropic regions. The first isotropic region is adjacent the upper layer and the second isotropic region is adjacent the lower layer. The pores of the first isotropic region are smaller than the pores in the upper layer, but larger than the pores of the second isotropic region, while the pores of the second isotropic region are smaller than the pores in the lower layer.

The microporous membrane of the invention is particularly suitable for filtration of fluids in the field of microfiltration.

BRIEF DESCRIPTION OF THE DRAWINGS

FIG. 4 is a graph showing the distribution of pore sizes in the first and second isotropic regions of the microscopic membrane shown in FIG. 1.

DETAILED DESCRIPTION OF THE PREFERRED EMBODIMENTS

Figure 1:
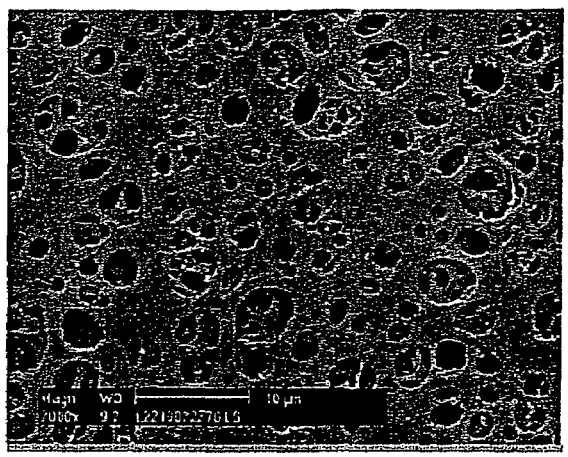
FIG. 1 is a 2000× scanning electron microscope (SEM) photo of the upper or feed side layer of an exemplary microporous membrane of the invention.

In the context of the present invention, the term "integral protective layers" means that the upper and lower porous protective layers are an integral structural component of the membrane. This means that the upper and lower layers are formed during the process of the invention on both sides of the intermediate layer of the membrane, so that there is no need to later graft on such protective layers. Likewise, the two isotropic regions are developed during the process of the invention. The relative expressions "smaller pores" and "larger pores" are to be understood within the context of the invention as meaning pores having smaller or larger median pore diameters. The microporous membrane of the invention exhibits a pore structure between the upper layer (adjacent the first isotropic region) and the lower layer (adjacent the second isotropic region) wherein the pores of the upper layer are generally larger than the pores of the lower layer.

The density of the pores, that is to say the number of pores per unit surface area in the two porous protective layers of the inventive membrane, may be measured visually with the aid of an SEM photo, and is preferably in the range of $1 \times 10^4$ to $1 \times 10^6$ pores/mm$^2$. The pore density in the upper layer (feed or gas side) is preferably in the range from $1 \times 10^4$ to $5 \times 10^5$ pores/mm$^2$. The pore density in the lower layer (base side) is preferably in the range from $3 \times 10^5$ to $1 \times 10^6$ pores/mm$^2$. Particularly preferred is a pore density in the upper layer of from $3 \times 10^4$ to $3 \times 10^6$ pores/mm$^2$, and a pore density in the lower layer of from $4 \times 10^5$ to $7.5 \times 10^5$ pores/mm$^2$.

The median diameter of the pores in the upper layer are preferably in the range from 0.4 μm to 15 μm, while 0.8 μm to 5.0 μm is particularly preferred. The median diameter of the pores in the lower layer are preferably in the range from 0.1 μm to 3.0 μm, while 0.5 μm to 2.0 μm is particularly preferred. The porous upper and lower layers of the microporous membrane of the invention which are formed as a monolayer exhibit a thickness of <1 μm.

The expression "isotropic region" herein means a region in the intermediate layer of the microporous membrane which displays a substantially uniform median pore size. The sponge-like intermediate layer of the inventive microporous membrane comprises two discrete but integrally arranged isotropic regions, each of which has pores of substantially uniform size, the pore sizes changing abruptly at the boundary or transition between the first and second isotropic regions. This is shown graphically in FIG. 4. The pores in both isotropic regions differ with respect to their median pore diameters, preferably by a factor in the range from 1.4 to 16, more preferably by a factor of from 2 to 12, and most preferably by a factor of from 2.5 to 6. The median pore diameter in the first isotropic region adjacent the feed or gas side ranges from about 0.05 μm to about 0.30 μm. The median pore diameter in the second isotropic region adjacent the base side ranges from about 0.20 μm to 0.80 μm.

The microporous membrane of the invention is preferably produced with a total thickness (after drying) of from about 5 μm to about 1,000 μm, more preferably from about 20 μm to about 500 μm, and most preferably from about 60 μm to about 180 μm.

One of the isotropic regions in the inventive microporous membrane makes up 20% to 80% of the thickness of the intermediate sponge-like layer, more preferably 40% to 80%, and most preferably about 50%, with the balance of the sponge-like structure comprising the other isotropic region.

The first or the second isotropic region of the microporous membrane of the invention has a thickness in the range from about 15 μm to about 200 μm, more preferably from about 20 μm to about 160 μm, and most preferably from about 30 μm to about 90 μm. The first and the second isotropic regions combined have a thickness in the range from about 80 μm to about 250 μm, preferably from about 90 μm to about 190 μm.

The cellulosic microporous filtration membrane of the invention is substantially fabricated from a cellulosic polymer that may include conventional additives. Preferred cellulosic polymers are cellulose esters, such as cellulose acetate, cellulose propionate, cellulose butyrate, cellulose acetobutyrate, cellulose acetopropionate, cellulose nitrate, etc., and mixtures thereof. Regenerated cellulose, which is manufactured after an additional saponification of cellulose acetates, is also a preferred material for the microporous membrane of the invention. Preferred cellulose esters are cellulose acetates, and cellulose triacetate, cellulose diacetate and mixtures of cellulose triacetate with cellulose diacetate are particularly preferred.

The average molecular weight (MW) of the cellulosic polymer such as a cellulose acetate comprising a mixture of cellulose diacetate and cellulose triacetate is normally in the range from $1 \times 10^5$ to $5 \times 10^5$ g/mole.

A preferred cellulosic starting material is a mixture of (a) cellulose triacetate with acetylation level or acetic acid content of from about 58% to about 62.5%, and (b) cellulose diacetate with an acetylation level of from about 51% to about 57%, and a cellulose triacetate:cellulose diacetate weight ratio in the range from 1.5:1 to 0.8:1.

In order to increase the mechanical strength of the inventive membranes, a reinforcement material such as a non-woven material can be incorporated into the membrane. The reinforcement material can have for example a non-woven net-like structure, a grid structure, or a fabric structure constructed from conventional materials. Suitable reinforcement materials include all materials which do not form diffusion channels in polymeric membranes, and a preferred reinforcing material is a non-woven polymeric fabric.

The invention also provides a process for the production of the above-described microporous filtration membrane, comprising the following steps:

(a) providing a homogenous casting solution comprising a cellulosic polymer containing at least one highly volatile casting solvent for the cellulosic polymer and at least one volatile non-solvent for the cellulosic polymer;

(b) casting the casting solution onto a substrate or onto a reinforcing material such as a non-woven mat or a fabric in an inert gas atmosphere to create a thin film;

(c) evaporating both the highly volatile solvent and the volatile non-solvent in a controlled atmosphere, the atmosphere comprising at least the volatile non-solvent and an inert gas, until a white surface forms on the upper layer of the microporous membrane; and (d) drying the so-formed microporous membrane, preferably by circulating an inert gas over the membrane's surface.

The term "inert gas" means a gas or a gas mixture which does not contain any substances that react with the components of the casting solution or that cause precipitation of polymer from the casting solution. Exemplary substances that cause precipitation of polymer include water and alcohols.

In contrast to a conventional asymmetric membrane such as those described for instance in the aforementioned U.S. Patent Application Publication 2003/003081, the inventive method provides a microporous membrane having the largest diameter pores in the isotropic region closest to the upper layer, or first isotropic region, and with the smallest diameter pores in the isotropic region closest to the base, or second isotropic region.

The homogenous casting solution of step (a) of the process can also contain one or more additives commonly used for membrane casting solutions, such as glycerin and/or polyethylene glycol; or a plasticizer such as dimethyl phthalate, diethyl phthalate, dibutyl phthalate or dioctyl phthalate, etc. The casting solution can be made using conventional methods such as by mixing a cellulosic polymer and at least one highly volatile cellulosic solvent for a period of time sufficient to form a turbid solution that is substantially free of gel particles, generally from about 30 minutes to about 5 hours. This is followed by solvation at a low temperature as described in EP 0 723 993 B2 in paragraphs [0054] through [0059], the disclosure of which is incorporated herein by reference, which is then followed by blending in at least one volatile non-solvent for cellulosics.

When for example two different cellulosic polymers are employed, such as cellulose triacetate and cellulose diacetate, it is preferred that they are mixed separately in a suitable highly volatile solvent to form two separate solutions, followed by combining the two solutions and adjusting to the desired final concentration of the cellulosic polymer by the addition of at least one volatile non-solvent. A suitable concentration of the cellulosic polymer in the casting solution is from about 3 to about 20 wt %, relative to the total mass of the casting solution, more preferably from about 4 to about 18 wt %, and most preferably from about 5 to about 16 wt %.

The highly volatile solvent used in forming the casting solution is a solvent suitable for dissolution of a cellulosic polymer, in particular cellulose triacetate, cellulose diacetate or a mixture of the two, the solvent having a boiling point in the range from about 20° C. to about 65° C., preferably 25° C. to 60° C., and most preferably 27° C. to 35° C. The highly volatile solvent is preferably a halogen-free olvent, which makes for an environmentally friendly process for making the membrane of the invention. Suitable halogen-free, highly volatile solvents having boiling points in the range noted above are aliphatic carboxylic acid esters containing 2 to 5 carbon atoms, such as methyl acetate (boiling point 57° C.) and methyl formate (boiling point 32° C.), and mixtures thereof. The highly volatile solvent is normally used as at a concentration of 30 to 80 wt %, preferably 40 to 75 wt %, and most preferably 50 to 70 wt %, relative to the total mass of the casting solution. According to a particularly preferred embodiment methyl formate alone is used as the highly volatile solvent for the cellulosic polymer.

The volatile non-solvent used in the casting solution is a fluid that is incapable of completely dissolving the cellulosic polymer such as cellulose triacetate, cellulose diacetate or a mixture thereof, and has a boiling point of less than about 60° C., preferably from about 60° C. to about 150° C., and most preferably from about 70° C. to about 110° C. The volatile non-solvent is also preferably a halogen-free solvent. Suitable volatile non-solvents include, by way of example, water; alcohols such as methanol, ethanol, and propanols such as isopropanol, butanols, amyl alcohol, hexanols, heptanols and octanols; substituted or unsubstituted alkanes such as hexane, heptane, octane and nitropropane; ketones; carboxylic acids; ethers; and esters. Water (boiling point 100° C.), 2-propanol (boiling point 82° C.) and mixtures of those two are particularly preferred as the volatile non-solvent. The volatile non-solvent is usually employed at a concentration of from about 5 to about 50 wt %, preferably from about 10 to about 45 wt %, and most preferably from about 15 to about 40 wt %, relative to the total mass of the casting solution.

The use of the combination of a highly volatile solvent and a volatile non-solvent is one of the important factors for the development of the specific microporous filtration membrane of the invention that has two isotropic regions with the structure described herein and exhibiting the particular distribution of pore sizes described. According to a particularly preferred embodiment of the invention, the casting solution comprises (i) a mixture of 3.3 wt % cellulose triacetate and 3.3 wt % cellulose diacetate; (ii) 63.3 wt % methyl formate as the highly volatile solvent; (iii) a mixture of 16.5 wt % 2-propanol and 13.7 wt % water as the volatile non-solvent, and (iv) up to 0.5 wt % glycerin as an optional additive (all concentrations are based upon the total mass of the casting solution).

The casting of the casting solution is carried out in step (b) of the inventive process in conventional fashion, preferably on a planar substrate such as a glass plate. The casting solution can be spread for example by a sliding carriage having a predetermined speed, thereby permitting adjustment to a desired thickness of the cast film, as may be required. The thin film deposited in step (b) is typically a wet film having a thickness of from about 500 µm to about 2,500 µm, preferably from about 800 µm to about 1,500 µm, and most preferably about 1,000 µm.

The temperature of the casting solution and/or of the casting substrate is preferably from about 10° C. to about 40° C., more preferably from about 15° C. to about 30° C., and most preferably from about 12 to about 20° C. The temperature of the casting solution and/or of the casting substrate should be adjusted so that a controlled evaporation of both the highly volatile solvent and the volatile non-solvent can be achieved, so as to allow the formation of the specified structure of the inventive membrane described herein.

In the context of the invention, it was determined that the controlled atmosphere of step (c) best comprises at least the highly volatile solvent, the volatile non-solvent and the inert gas; this atmosphere is important for the formation of the specific structure of the membrane according to the invention. In a preferred embodiment, the controlled atmosphere contains the volatile solvents methyl formate and methyl acetate; and the volatile non-solvents 2-propanol, ethanol and water. To facilitate formation of the desired pore size distribution in the microporous membrane, it is most preferred that the controlled atmosphere includes, in addition to the inert gas, methyl formate, water and 2-propanol. The temperature of the controlled atmosphere is typically maintained at from about 10° C. to about 40° C., more preferably from about 18° C. to about 25° C.

The evaporation step specified in step (c) in the controlled atmosphere is also important for formation of a microporous membrane having the particular aforementioned pore structure of two discrete isotropic regions which, rather surprisingly, exhibit different median pore sizes. This evaporation step (c) is conducted until a white surface forms on the upper layer of the microporous membrane, this being a telltale sign that formation of the membrane is complete. The time to accomplish this may be varied, depending on the composition and temperature of the casting solution as well as on the temperature of the casting substrate, and generally ranges under typical production conditions, from about 10 to about 35 minutes.

The drying of the microporous membrane described in step (d) of the inventive process preferably takes place by flowing an inert gas directly over the surface of the formed membrane. The inert gas can be a conventional inert gas such as argon or nitrogen, with nitrogen being preferred. The temperature of the inert gas stream is in a range from about 20° C. to about 60° C., preferably from about 25° C. to about 50° C., to achieve an effective removal of both the highly volatile solvent and the volatile non-solvent.

The outer protective (upper and lower) layers of the microporous membranes are formed as a result of the limited solubility of the cellulosic polymer in the non-solvent. During the evaporation of the non-solvent from the surface of the membrane, the dissolved component forms the outer "skins" or upper and lower protective layers. Consequently, the upper layer (feed or gas side) is formed at the end of the membrane formation, shortly before the white surface is developed, wherein that portion of the cellulosic polymer that has not been dissolved in the non-solvent phase partially covers the surface. The formation of the lower layer, which is slightly thicker, is explained by the fact that the non-solvent does not contact the lower side layer, but instead is present only in the pore channels, before it emerges on the surface. Only a very small part of the dissolved cellulosic polymer is precipitated and thus thickens the walls of the pores.

The inventive microporous filtration membrane can be produced by the process of the invention in an environmentally friendly manner without using a cellulosic solvent containing halogen, and is very suitable in particular for filtration of fluids in the microfiltration field, in particular for pre-filtration and end-filtration of industrial fluid media, in laboratories and in the environmental field. Depending on the application, the membrane can also be reinforced, for example, with a non-woven material.

EXAMPLE 1

A casting solution was prepared as follows. Methyl formate was placed into a mixing vessel and cellulose triacetate (acetylation level 58 to 62.5%) was added to achieve a solution having a 10 wt % solids content. After stirring for 3 hours at 20° C., a homogeneous turbid solution was obtained containing no visible gel particles. The turbid solution was then cooled in a cryostat containing a cooling bath to −55° C. for about 90 minutes and stirred slowly so that a temperature of <−40° C. (measured with a PT-100 thermocouple) was achieved throughout the entire solution. The solution was then removed from the cooling bath, allowed to warm to room temperature while stirring, and tested with a transmission probe standardized to 100% transmission for pure methyl formate, to test the homogeneity of the solution. The transmission preferably is >90% and so tested in this case.

Methyl formate was similarly mixed with cellulose diacetate (acetylation level 51 to 57%) in a second mixing vessel to achieve a 10 wt % homogeneous solution.

The cellulose triacetate and cellulose diacetate solutions were mixed together in equal parts to achieve a total solids content for the two solutions of 10 wt %, with a 1:1 ratio of cellulose triacetate to cellulose diacetate. A mixture of methyl formate, 2-propanol and water was then added to the mixture to form a casting solution having the following composition: 3.3 wt % cellulose triacetate, 3.3 wt % cellulose diacetate, 63.3 wt % methyl formate, 16.5 wt % 2-propanol, and 13.7 wt % water. To this casting solution 0.5 wt % glycerin was added, relative to the total mass of the casting solution.

EXAMPLE 2

The casting solution of Example 1 was spread by a sliding carriage onto a glass plate substrate heated to 18° C. in a chamber swept with a controlled atmosphere using nitrogen as an inert gas. The thickness of the so-cast film, adjusted with a drawing knife, was 1,000 µm. The structure of the membrane was developed by the evaporation of the solvent and of the non-solvent from the cast film, which occurred in a controlled atmosphere comprising solvent, non-solvent and an inert gas as described, with the gas flowing in the film-drawing direction, at a height of about 20 cm above the cast film.

Evaporation was continued until formation of a white surface on the upper layer of the membrane, signaling completion of the membrane formation. A nitrogen sweep was then directed across the membrane for 90 minutes in order to remove residual solvent and non-solvent. The membrane obtained in this manner was characterized by the physical measurements set forth in Table 1, wherein each item represents a median value obtained from 5 measurements with 10 mL of water, a trans-membrane pressure of 1 bar, and an effective filter surface of 12.5 $cm^2$.

TABLE 1

| Water Flux (mL $min^{-1}$ $cm^{-2}$ $bar^{-1}$) | Bubble Point (bar) | Bursting Pressure (bar) | Thickness (µm) |
|---|---|---|---|
| 26.68 | 4.38 | 0.87 | 120.8 |

Flux was measured according to DIN 58355 (Part 1). Bubble pressure was conducted according to DIN 58355 (Part 2). Thickness of the membrane was measured with thickness measuring device No. 33105 (Hahn & Kolb Werkzeuge GmbH Co., Stuttgart, Germany).

Figure 2:
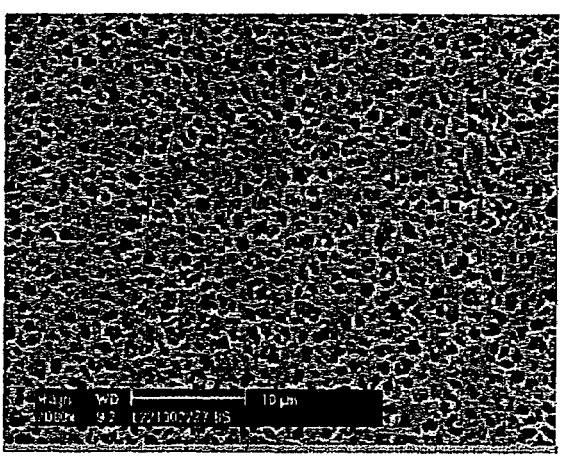
FIG. 2 is a 2000× SEM photo of a cross-section of the lower or base layer of the microporous membrane shown in FIG. 1.
Figure 3:
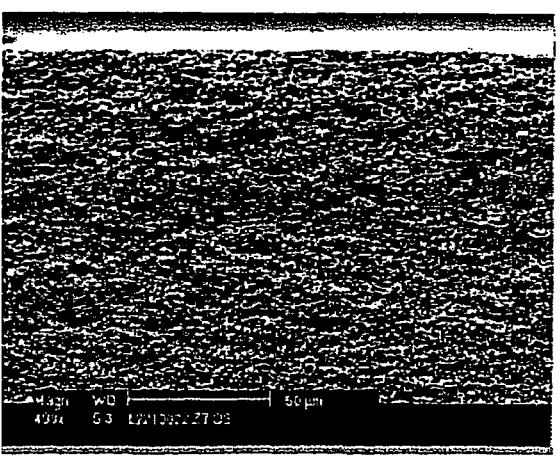
FIG. 3 is a 499× SEM photo of a cross-section of the entire microporous membrane shown in FIG. 1 and wherein the upper layer corresponds to the feed or gas side and the lower layer corresponds to the base side.

FIGS. 1-3 are SEM photos of various aspects of the so-manufactured membrane. As one can see from FIG. 2, which shows a cross-section of the membrane, a clear asymmetry of pore sizes can be seen between the upper layer, which was exposed to the controlled atmosphere, and the lower layer of the membrane in contact with the casting glass plate. The pore sizes noted below were obtained from a visual evaluation of the maximum pore sizes in the upper layer and those in the lower layer that was in contact with the glass plate substrate.

Pore diameter in upper layer (PO): approximately 6.0 µm
Pore diameter lower layer (PG): approximately 1.60 µm
Ratio of PO/PG=3.75

The structure of the two isotropic regions of the so-manufactured microporous membranes were further characterized by determining the absolute mass flow rate (flux) of a standard sugar solution (10 wt % raw sugar from sugar cane) in water at 20° C. From this filtration test, a flux ratio of top side feed to bottom side feed through the membrane was determined to be 3.4:1 as to the maximum filterable mass of the sugar test solution until blinding of the membrane occurred.

Porisimetry measurements of the so-manufactured membrane were made according to the ASTM 1294-89 protocol, conducted with a capillary flow Porisimeter Model No. APP-1200 AEXI (AEXI Porous Materials Co., Inc. of New York, N.Y.). Assuming substantially cylindrical pores, such measurements yielded the following pore sizes:

Largest pores: 0.426 µm
Smallest pores: 0.152 µm
Ratio of largest to smallest pores: 2.80
Most common pores: 0.395 µm The membrane's gas flux was measured both wet and dry as a function of the trans-membrane gas pressure (air or nitrogen). Wetted membrane flux was used in relation to dry membrane flux, which made it possible to measure the size and the number of the pores. Using this type of measurement, the median value of the pore size ratio PO/PG of the so-manufactured microporous membrane was determined to be 3.3:1, which correlated well with the calculated values from the SEM photos.

FIG. 4 shows the standard distribution of the pore sizes and most common pore size in the isotropic regions of the so-manufactured microporous membrane. As one can see from FIG. 4, the distribution of pore sizes is very narrow in both isotropic regions. The first isotropic region comprises a plurality of pores having a pore diameter of about 0.4µm, while the second isotropic region comprises a plurality of pores having a pore diameter of about 0.1 µm. The two isotropic regions of the microporous membrane were further characterized by substantially uniform pore sizes. The number of pores in the transition between the two isotropic regions was relatively low, which is evident from the low standardized frequency of pore sizes in the range from 0.25 µm to 0.75 µm.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

The invention claimed is:

1. An asymmetric cellulosic microporous membrane having three distinct regions comprising (i) a porous upper layer, (ii) a porous lower layer, and (iii) a porous intermediate portion between said upper and lower layers, wherein said intermediate portion has a first isotropic region adjacent the upper layer and a second isotropic region adjacent the lower layer, and wherein the pores of the said first isotropic region are smaller than the pores in said upper layer but larger than the pores in said second isotropic region; and the pores of said second isotropic region are smaller than the pores in said lower layer and wherein said membrane is formed from a casting solution comprising a cellulose acetate, a solvent selected from methyl formate and methyl acetate and a non-solvent and, following casting, is dried with an inert gas.

2. The membrane of claim 1 wherein the pore density in said upper and lower layers ranges from $1 \times 10^4$ to $1 \times 10^6$ pores/$mm^2$.

3. The membrane of claim 2 wherein the pore density in said upper layer ranges from $1 \times 10^4$ to $5 \times 10^5$ pores/mm$^2$ and the pore density in the lower layer ranges from $3 \times 10^5$ to $1 \times 10^6$ pores/mm$^2$.

4. The membrane of claim 2 wherein the median diameter of the pores in said upper layer ranges from 0.4 to 15 μm and the median diameter of the pores in said lower layer ranges from 0.1 to 3.0 μm.

5. The membrane of claim 4 wherein the median pore diameter of said pores in said first and second isotropic regions differ by a factor of 1.4 to 16.

6. The membrane of claim 5 wherein one of said first and second isotropic regions constitutes 20% to 80% of the thickness of said intermediate layer.

7. The membrane of any of claims 1-3, 4 or 5-6 wherein said cellulosic microporous membrane comprises a cellulose acetate selected from the group consisting of cellulose triacetate, cellulose diacetate, and mixtures thereof.

8. The membrane of claim 7 wherein said cellulosic microporous membrane comprises a mixture of (i) cellulose triacetate having an acetylation level of from 58% to 62.5%, and (ii) cellulose diacetate having an acetylation level in a range from 51% to 57%, and wherein the weight ratio of (i):(ii) is from 1.5:1 to 0.8:1.

9. The membrane of claim 8 further comprising a reinforcement material integrated into said membrane.

* * * * *

UNITED STATES PATENT AND TRADEMARK OFFICE
CERTIFICATE OF CORRECTION

| | | |
|---|---|---|
| PATENT NO. | : 7,381,330 B2 | Page 1 of 1 |
| APPLICATION NO. | : 10/554980 | |
| DATED | : June 3, 2008 | |
| INVENTOR(S) | : Petersen et al. | |

It is certified that error appears in the above-identified patent and that said Letters Patent is hereby corrected as shown below:

Column 4, line 62: Change "halogen-free olvent" to -- halogen-free solvent --

Signed and Sealed this

Eighteenth Day of November, 2008

JON W. DUDAS
*Director of the United States Patent and Trademark Office*